United States Patent [19]

Bobel

[11] Patent Number: 5,371,438
[45] Date of Patent: Dec. 6, 1994

[54] ENERGY CONVERSION DEVICE HAVING AN ELECTRONIC CONVERTER WITH DC INPUT TERMINAL FOR DELIVERING A HIGH FREQUENCY SIGNAL

[76] Inventor: Andrzej A. Bobel, 201 Norman Ct., Des Plaines, Ill. 60016

[21] Appl. No.: 5,817

[22] Filed: Jan. 19, 1993

[51] Int. Cl.$^5$ ............................................. H05B 37/00
[52] U.S. Cl. .................................... 315/200 R; 315/219; 315/239; 315/DIG. 5; 315/DIG. 7
[58] Field of Search ............... 315/200 R, 219, 205, 315/209 R, DIG. 5, DIG. 7, 239

[56] References Cited

U.S. PATENT DOCUMENTS

| | | |
|---|---|---|
| 3,084,283 | 4/1963 | Grunwaldt . |
| 4,017,785 | 4/1977 | Perper ........................... 321/4 |
| 4,109,307 | 8/1978 | Knoll ........................... 363/101 |
| 4,723,098 | 2/1988 | Grubbs ........................ 315/239 X |
| 4,782,268 | 11/1988 | Fähnrich et al. ............... 315/200 R |
| 4,965,493 | 10/1990 | Van Meurs et al. ........ 315/DIG. 5 X |
| 5,010,277 | 4/1992 | Courier de Mere ............ 315/200 R |

*Primary Examiner*—Benny Lee
*Assistant Examiner*—Hassa Philogene
*Attorney, Agent, or Firm*—Hill, Steadman & Simpson

[57] ABSTRACT

A power line-operated electronic converter is adapted to deliver a relatively constant magnitude high frequency signal to a load (113) and is operable to draw a substantially sinusoidal current from the AC voltage source (101). The converter has DC input terminals (B+, B−) having a capacitor (111) connected therebetween, first and second rectifier bridges (137, 138) coupled to the DC input terminals, a transistor inverter (131) coupled to the DC input terminals, a resonant oscillator circuit (135) coupled to the DC input terminals and to the transistor inverter employing a resonant inductor (117) and a resonant capacitor (114), and an input-output feedback implemented by coupling and modulation of a voltage developed across the resonant inductor to a voltage proportional to a difference of a voltage developed across DC input terminals and a voltage provided by a rectified AV voltage source.

11 Claims, 4 Drawing Sheets

ENERGY CONVERSION DEVICE HAVING AN ELECTRONIC CONVERTER WITH DC INPUT TERMINAL FOR DELIVERING A HIGH FREQUENCY SIGNAL

FIELD OF THE INVENTION

This invention relates to power-line-operated electronic ballasts for gas discharge loads.

BACKGROUND OF THE INVENTION

In general, to meet industry requirements, a ballast for a gas discharge lamp has to meet the following fundamental requirements: (i) draw power from a power line a power factor of at least 90%, (ii) draw current from the power line with total harmonic distortion of less than 20%, and (iii) provide a load current crest factor of less than 1.7, where the "crest factor" is equal to a peak magnitude of the load current divided by its effective (RMS) value.

Furthermore, there are many other requirements like: a) circuit simplicity—parts count and cost shall be low, b) the design shall be very adaptable to all line voltages and lamps kinds as well as number of lamps to be powered, c) the design shall be easy manufacturable in large quantities with great repeatability as required by industry quality standards, d) the design shall be insensitive to high and low ambient temperatures, e) the design shall operate within specification when smaller power rated lamps of the same group being connected as load, f) the design shall be insensitive to line voltage variations, and g) the design shall provide for long life of a ballast. These requirements and more all apply to electronic ballasts as well.

In an electronic ballast, which generally requires a well filtered DC voltage for operating an inverter that powers the gas discharge load, a front stage converter is required. Then, such well filtered DC voltage may be attained without incurring any substantial harmonic distortion of the current drawn from the power line. However, the cost penalty associated with the front end converter in an electronic ballast is substantial. It is highly desirable to have a simple and low cost single stage electronic ballast which will meet all of the above requirements.

Many known devices of this kind have been described previously, notably, in the following U.S Pat. Nos.: 4,017,785 to Perper; 4,109,307 to Knoll; 4,782,268 to Fahnrich, and 5,010,277 to Courier de Mere.

Construction and evaluation of the above inventions, revealed, that some devices meet many of the requirements mentioned above, however, none of the devices satisfies all of them.

SUMMARY OF THE INVENTION

In accordance with the invention, there is provided an energy conversion device employing an electronic converter having DC input terminals and being adapted to deliver a high frequency signal at its output terminals and comprising:

voltage source means able to provide an input current;

first rectifier means having AC input terminals and DC output terminals, and the AC input terminals are connected to the voltage source means;

second rectifier means having AC input terminals and DC output terminals; and the DC output terminals of the first and second rectifier means are suitably oriented, connected in circuit and coupled to the DC input terminals;

capacitor means coupled to the DC input terminals;

semiconductor switching means coupled to the DC input terminals;

resonant oscillator circuit means coupled to the DC input terminals and to the semiconductor switching means; the resonant oscillator circuit means operable to draw an alternating current from the DC input terminals, and comprising:(i) a resonant inductor having a primary winding and a secondary winding, (ii) a resonant capacitor connected in circuit with the primary winding of the resonant inductor and coupled effectively across the output terminals, (iii) a switching feedback loop responsive to the instantaneous magnitude of the alternating current and operable to deliver to the semiconductor switching means a switching signal proportional to the instantaneous magnitude of the alternating current; and input-output means implemented by connection of the secondary winding of the resonant inductor to the AC input terminals of the second rectifier means, and operable to provide (i) substantially constant magnitude of the high frequency signal at the output terminals, and (ii) substantially sinusoidal waveform of the input current.

In such a device the input current waveform is substantially sinusoidal, the total harmonic distortion of the current is below 20%, power is drawn from the power line with a power factor of 99%, and lamp current crest factor is below 1.7.

The circuitry of the device is: a) very simple—with very low parts count, b) easily adaptable to all line voltages, lamps kinds and their number, c) insensitive to low and high temperatures—operates in instable mode and with relatively constant power transfer over the temperature variation, d) holding stable its critical parameters with input voltage variations.

DESCRIPTION OF THE PREFERRED EMBODIMENT

Figure 1:
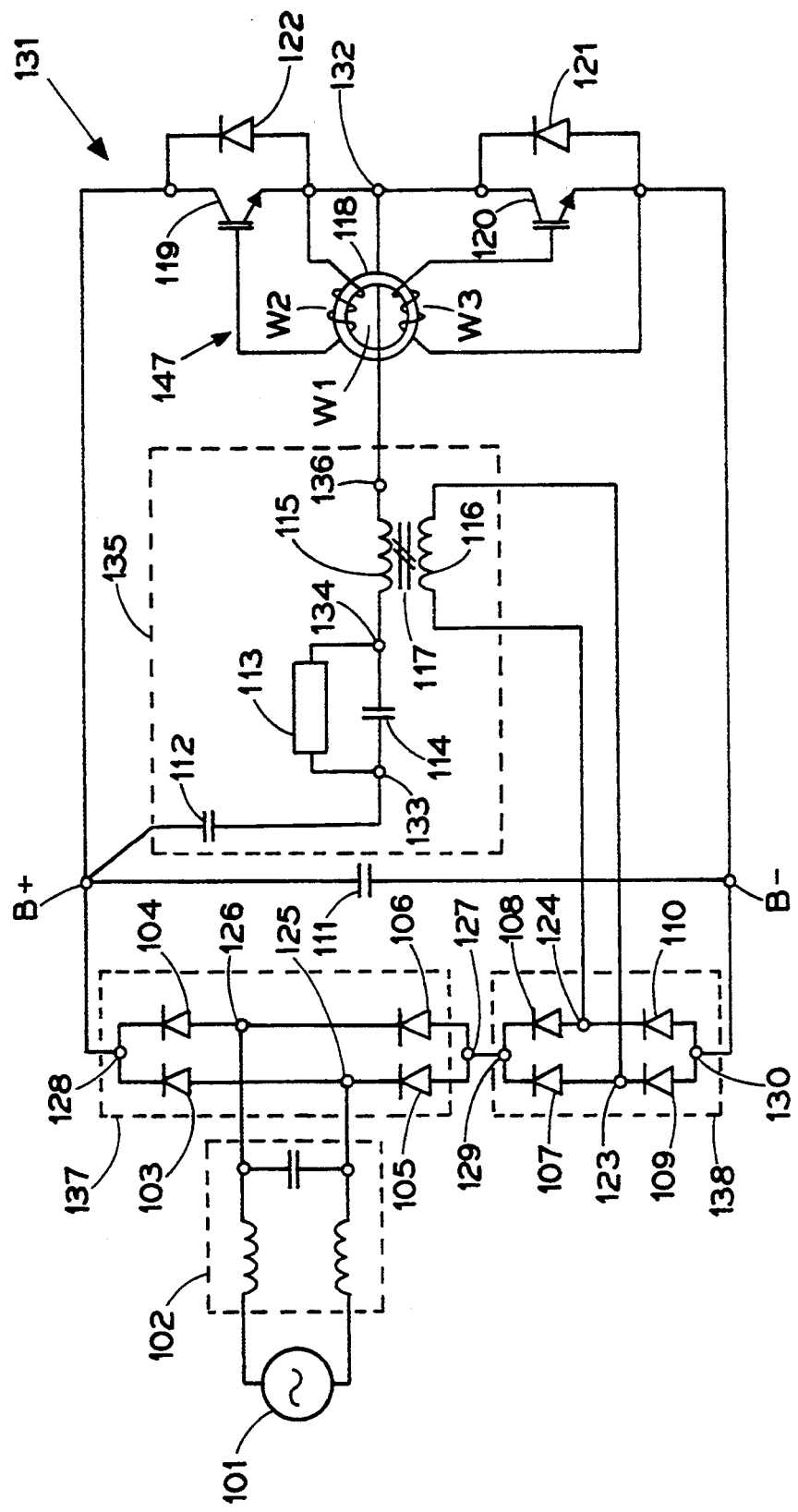
FIG. 1 schematically illustrates the invention in its main preferred embodiment.

FIG. 1 schematically illustrates the main preferred embodiment of the invention in the form of an electrical circuit diagram.

In FIG. 1, a voltage source 101 represents an ordinary 120 Volt/60 Hz electric utility power line and is connected through a RFI/EMI filter 102 to AC input terminals 125 and 126 of a full wave rectifier bridge 137. The bridge 137 is made of rectifier diodes 103, 104,105 and 106. The bridge has DC output terminals 127 and 128. The terminal 128 is connected to terminal B+, which is the positive one of the two DC input terminals. Four diodes 107,108,109 and 110 are connected in a full wave rectifier bridge 138 forming two AC input terminals 123,124 and two DC output terminals 129, 130. The terminal 127 is connected to terminal 129. The terminal 130 is connected to terminal B−, which is the negative one of the two DC input terminals. An electrolytic capacitor 111 of relatively small value is connected to terminals B+ and B−.

A half-bridge inverter 131 has a bipolar transistor 119 (of the type MJE 13005) connected at its collector electrode to the positive DC input terminal B+. The transistor 119 has its emitter electrode connected to a node 132. A diode 122 has its cathode connected to the positive DC input terminal B+ and has its anode connected to the node 132. A further npn transistor 120 (like the transistor 119, of the type MJE 13005) of the inverter 131 has its collector electrode connected to the node 132. The transistor 120 has its emitter electrode connected to the negative DC input terminal B−. A diode 121 has its cathode connected to the node 132 and has its anode connected to the terminal B−.

A series resonant tank circuit 135 has a DC blocking capacitor 112 (having a value of approximately 0.1 uF) and resonant capacitor 114 (having a value of approximately 10 nF), and a primary winding 115 of a resonant inductor 117 (having a value at a primary winding 115 of approximately 1.4 mH) connected in series between the terminal B+ and the node 136 via a node 133 and via a node 134.

A gas discharge load 113 is connected across capacitor 114 between output terminals 133, 134.

A feedback transformer 147 has a primary winding W1 (having 1 turn) and two secondary windings W2, W3 (each having approximately 3 turns) wound on a core 118. The primary winding W1 of the transformer 147 is connected in series with the series resonant tank circuit 135 between the node 136 and the node 132. The secondary winding W2 is connected between base and emitter electrodes of the transistor 119. The secondary winding W3 of the transformer 147 is connected (with opposite polarity with respect to the secondary winding W2) between base and emitter electrodes of the transistor 120.

A secondary winding 116 of a resonant inductor 117 is connected to terminals 123, 124.

Figure 4:
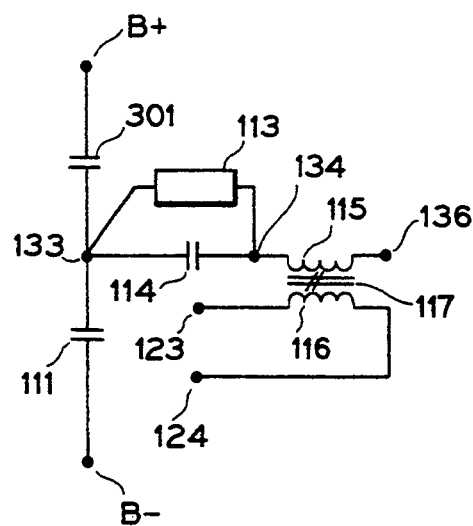
FIG. 4 is a fragmentary illustration of a variation of the circuit of FIG.1.

FIG. 4 illustrates an alternative version of the preferred embodiment of FIG. 1. An electrolytic capacitor 301 replaces DC blocking capacitor 112. Two capacitors 301 and 111 (having equal value of approximately 22 uF) are connected in series between the DC input terminals B+, B− via a node 133. A capacitor 114 and a load 113 both are connected to the node 133.

Figure 5:
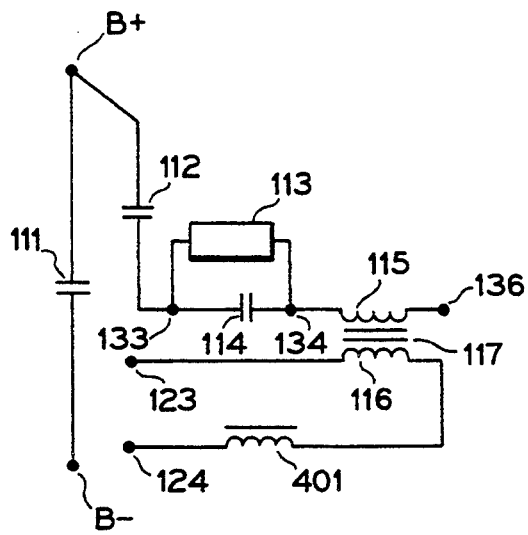
FIG. 5 is a fragmentary illustration of another variation of the circuit of FIG. 1.

FIG. 5 illustrates another alternative version of the preferred embodiment of FIG. 1. A secondary winding 116 of an inductor 117 is connected to AC input terminals 123, 124 through series connected ballasting inductor 401.

Figure 6:
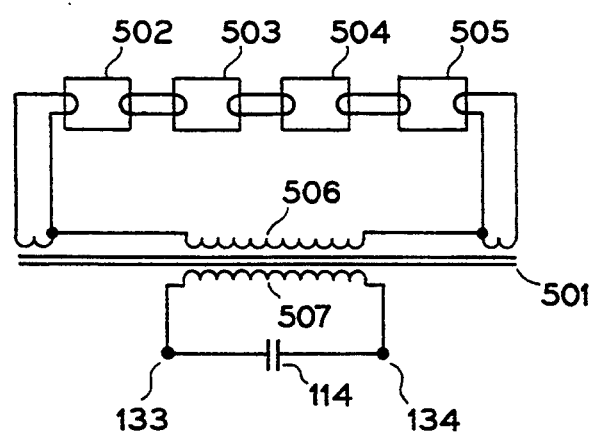
FIG. 6 is a fragmentary illustration of yet another variation of the circuit of FIG. 1.

FIG. 6 illustrates yet another alternative version of the preferred embodiment of FIG. 1. The load 113 of FIG. 1 is connected—in this version—to output terminals 133, 134 through an isolation transformer 501. The transformer 501 has a primary winding 507 connected in parallel between the output terminals 133, 134. Multiple lamp type—series connected gas discharge loads 502, 503, 504, 505 are connected to a secondary winding 506 of the transformer 501. It is obvious that the multiple lamp type load may consist of at least one lamp.

DETAILS OF OPERATION

In order to clearly describe the operation of the device of FIG. 1, the secondary winding 116 of the inductor 117 will be open. This means that no feedback will be provided to terminals 123, 124.

FIGS. 2(a)-2(d) and FIG. 3(a)-3(d) indicate various current and voltage waveforms illustrative of the operation of the device of FIG. 1 without the feedback from the inductor 117.

With reference to the waveforms of FIGS 2(a)-2(d) the operation of the device of FIG. 1 (without the feedback from the inductor 117) is very similar to the device explained in U.S. Pat. No. 3,084,283 to Grunwaldt. The only difference is one of the objects of this invention accomplished by providing two rectifier bridges 137, 138. By such a connection of the bridges 137, 138 between the DC input terminals new behavior of the device was discovered.

A DC input voltage developed across DC input terminals B+, B− (FIG. 2a) is a result of commonly known rectification of voltage delivered by AC voltage source 101 and filtering by capacitor 111.

The device starts oscillations by triggering provided with a commonly known diac circuit (not shown). The converter is delivering a constant magnitude voltage and constant magnitude current at its output terminals 133,134. The frequency of the switching inverter 131 is equal or above the resonant oscillation frequency of the series resonant tank circuit 135 which includes load 113.

A voltage of a modulated magnitude is developed across terminals 129, 130 and the voltage is a result of drawing of AC current by the converter from the energy storing capacitor 111 connected between terminals B+, B−. The voltage across terminals 129, 130 is equal to instantaneous difference between the DC input voltage and the rectified, not filtered and pulsating voltage present between terminals 127,128. The peak magnitude of the DC input voltage is equal to peak magnitude of the rectified AC voltage source 101.

Figure 2A:
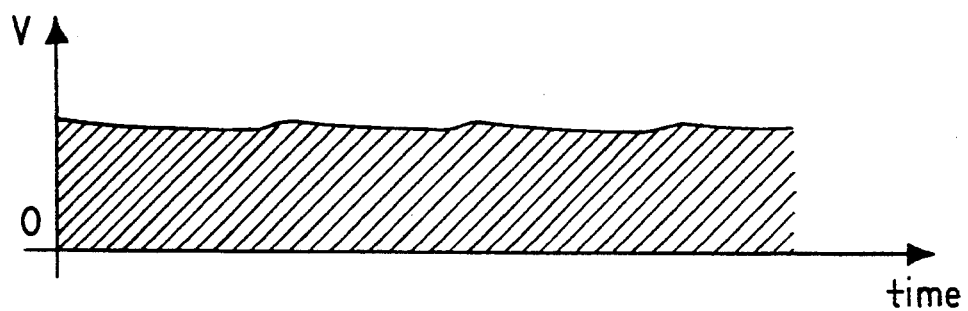
FIGS. 2(a)-(d) and FIGS. 3(a)-(d) show various current and voltage waveforms associated with the operation of the main preferred embodiment.
Figure 2B:
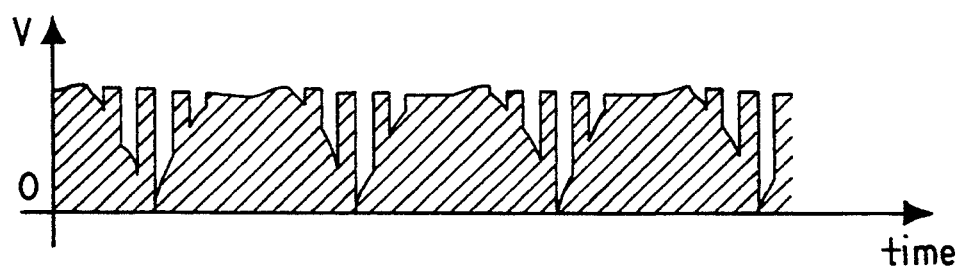
Figure 2C:
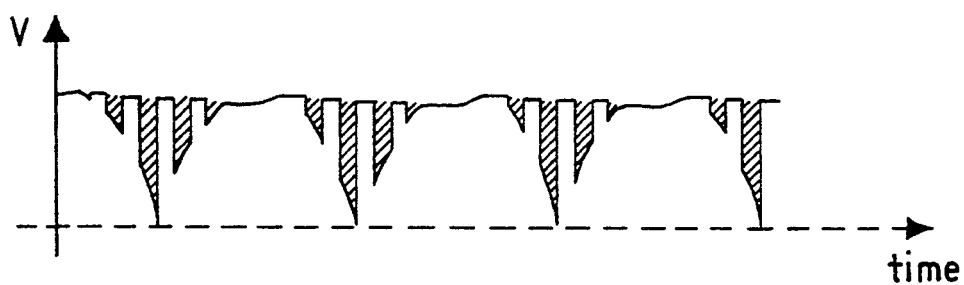

A waveform of the voltage across terminals 127,128 is presented in FIG. 2(b). A waveform of the voltage developed across terminals 129,130 is presented in FIG. 2(c).

Figure 2D:
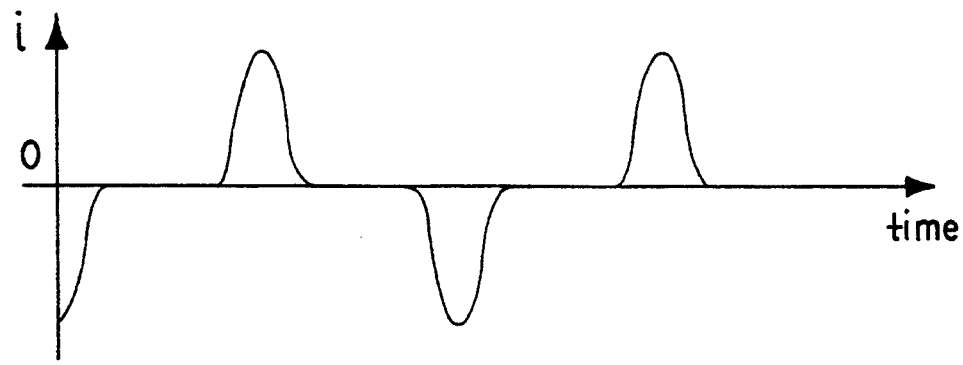

A waveform of the input current is presented in FIG. 2(d).

The oscillation frequency (fo) of the series resonant tank circuit 135 can be expressed by the following formula:

$$\omega = \sqrt{\frac{1}{LC} - \frac{1}{4R^2C^2}}$$

where:
 $\omega = 2\pi fo$
 L = inductance of the resonant inductor 117 measured at its primary side 115;
 C = capacitance of the resonant capacitor 114;
 R = resistance of a load.

A feedback obtained by the feedback transformer 137 for the self-oscillation of the converter is in phase with an output current delivered at the output terminals 133,134. Thus, the frequency obtained always adjusts itself—it increases according as the load 113 connected across the capacitor 114 is larger. Under these conditions, it can be proved that, if the resonant inductor 117 and resonant capacitor 114 are free of losses, the current supplied to the load 113 is independent of the resistance of the load thereof. This current depends only upon the DC input voltage at the terminals B+, B— and upon the quotient $$\frac{L}{C}$$

Furthermore, the output voltage magnitude is relatively constant as this is a characteristic of a gas discharge load. Thus, the voltage across the resonant inductor is relatively constant, as this is a characteristic of the series resonant circuit, where voltage magnitude across the resonant capacitor is directly proportional to voltage magnitude across the resonant inductor. The series resonant circuit 135 is high-Q type with ability to produce across it resonant components 114, 115 voltages of much higher magnitudes than DC input voltage magnitude. And the voltages across the resonant components 114,115 can be easily modulated by providing modulation of a load R or by limiting and modulation of the voltage across one of the resonant components, and the pair appears in its effects on the series resonant circuit as modulation of effective value of L or C.

The operation of the device of FIG. 1 when the feedback voltage from the secondary winding 116 of the resonant inductor is provided at terminals 123, 124 will be referenced to waveforms of FIGS. 3(a)-3(d).

Whenever the voltage developed across the secondary winding 116 being provided at terminals 123 and 124, the interaction of input and output of the device begins. Such an interaction affects the limiting and modulation of the voltage across the secondary winding 116 to a voltage level being present across terminals 129,130. Thus, the resonant inductor value L is being effectively modulated. Whenever the voltage across the inductor is lower, the effective value of the inductor L becomes lower. However, despite such modulation, an alternating current associated with the series resonant circuit and a load current are being kept constant due to instantaneous self-adjustment of the switching frequency of the converter by the feedback transformer 137, so an impedance associated with the series resonant circuit is being kept relatively constant.

Figure 3A:
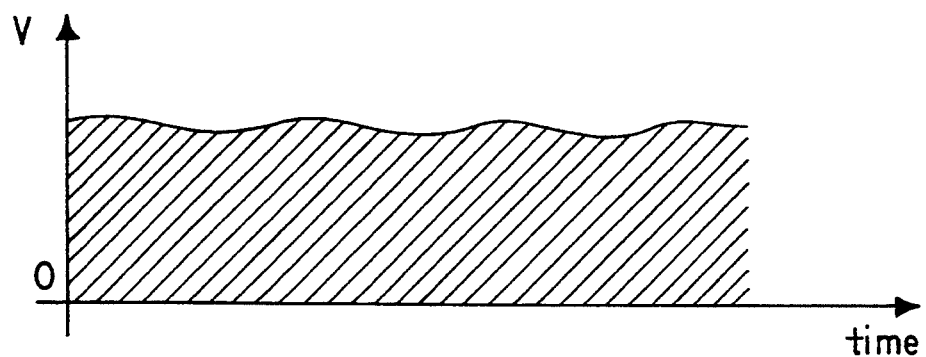
Figure 3B:
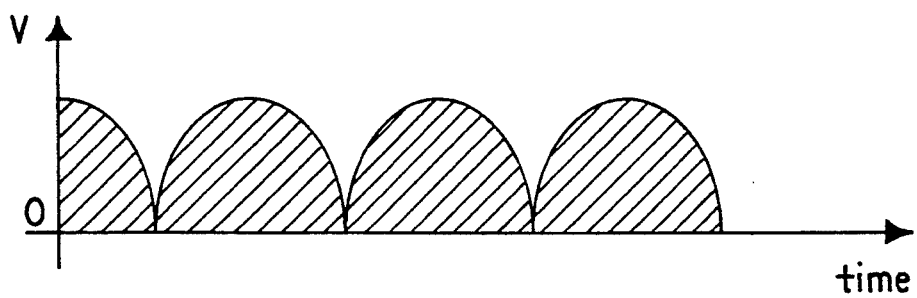
Figure 3C:
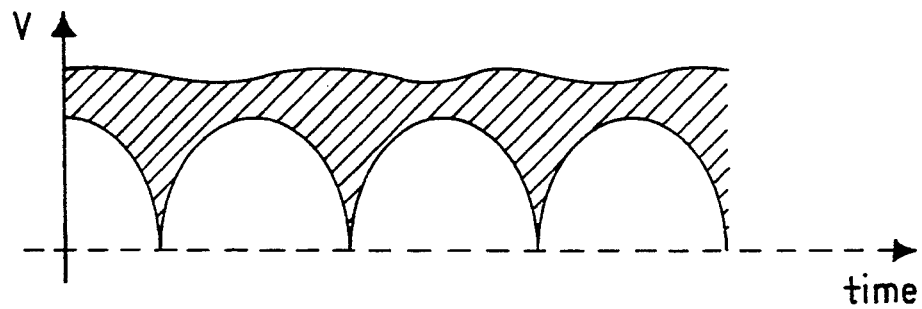
Figure 3D:
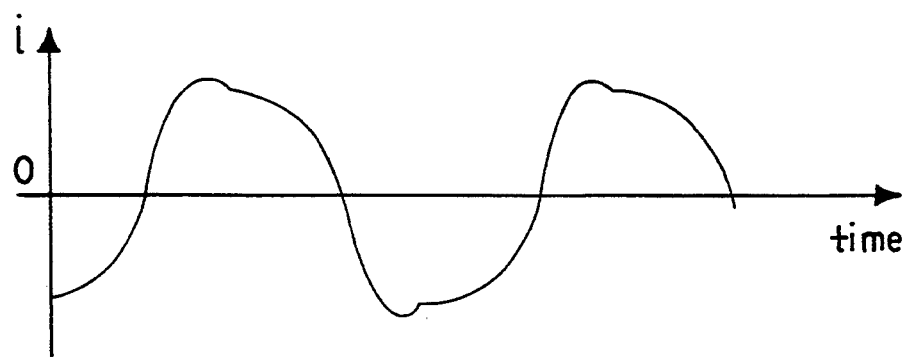

The voltage magnitude between terminals 129,130 (as per FIG. 3(c) is equal again to a difference of instantaneous magnitude of the DC input voltage developed across terminals B+, B— and instantaneous magnitude of rectified, not filtered (pulsating) voltage between terminals 127 and 128, the later being provided by rectified AC voltage source and is shown in FIG. 3(b).

The instantaneous magnitude of the DC input voltage which is equal to or higher than peak magnitude of the rectified AC voltage source. The parameters of deterrmining the magnitude of the DC input voltage as per FIG. 3(a), are: instantaneous and effective load value, Q-factor of the series resonant circuit, turns ratio of the resonant inductor windings, and leakage inductance associated with imperfect magnetic coupling between primary and secondary winding of the resonant inductor. All of the parameters mentioned above are factors in obtaining the device stability and proper operation.

It will be appreciated that due to the feedback provided by secondary winding 116 of the resonant inductor 117 to a bridge 138, the voltage magnitude to which the capacitor 111 is charged, being partially provided by AC voltage source and partially provided by the feedback from resonant inductor 117. Thus, a charging current of the capacitor 111 is partially being provided by AC voltage source, and partially by feedback from the resonant inductor 117. Therefore, the input current waveform (as per FIG. 3(d) taken from the AC voltage source is substantially proportional to the voltage waveform of the AC voltage source. The power is drawn from the power source with power factor of 99%, and current delivered to the device from the source has total harmonic distortion below 20%.

It will be also appreciated that, due to coupling of the resonant inductor voltage, and modulation of its magnitude being proportional to the voltage having instantaneous magnitude equal to the difference between instantaneous magnitude of the DC input voltage and instantaneous magnitude of the rectified AC voltage source, the voltage and current magnitudes provided at the output terminals 133, 134 are relatively constant. As a result, the load current crest factor is below 1.7.

It will thus be appreciated that the device, as described herein will provide for substantial stability of its critical parameters (input power, power factor, total harmonic distortion, load current crest factor) despite: a) large variations of nominal AC voltage source, b) application of other than nominal load type, c) subjecting the device to low and high temperatures.

It will be appreciated that device, as described herein, will be very simple—with very low parts count, easily adaptable to all power line voltages and load types, repeatable in manufacturing process, and inexpensive.

It will be also appreciated that various other modifications or alternatives to the above described embodiments will be apparent to the person skilled in the art without departing from the inventive concept described herein.

I claim:

1. An energy conversion device employing an electronic converter having DC input terminals and being adapted to deliver a high frequency signal at its output terminals and comprising:
   voltage source means providing an input current;
   first rectifier means having first AC input terminals and first DC output terminals wherein said AC input terminals are connected to the voltage source means;
   second rectifier means having second AC input terminals and second DC output terminals wherein said first and second DC output terminals are coupled to the DC input terminals;
   capacitor means coupled to the DC input terminals;
   semiconductor switching means coupled to the DC input terminals;
   resonant oscillator circuit means coupled to the DC input terminals and to the semiconductor switching means wherein said resonant oscillator circuit draws an alternating current from the DC input terminals, and further wherein the resonant oscillator circuit comprises: (i) a resonant inductor having a primary winding and a secondary winding; (ii) a resonant capacitor connected with the primary winding of the resonant inductor further and coupled across third output terminals, and (iii) a switching feedback loop responsive to instantaneous magnitude of the alternating current to deliver to the semiconductor switching means a switching signal proportional to the instantaneous magnitude of the alternating current; and
   input-output means connected to the secondary winding of the resonant inductor and to the AC input terminals of the second rectifier means wherein the input-output means provides (i) a substantially constant magnitude high frequency signal at the third output terminals and (ii) a substantially sinusoidal input current.

2. The device according to claim 1 wherein the voltage source means is a power line AC voltage source.

3. The device according to claim 2 wherein the first and second rectifier means each comprise a full wave rectifier bridge.

4. The device according to claim 1 wherein the capacitor means comprises a polarized electrolytic capacitor.

5. The device according to claim 1 wherein the semiconductor switching means is connected in a bridge configuration having a pair of npn bipolar transistors.

6. The device according to claim 1 wherein the switching feedback loop comprises a feedback transformer having a primary winding and two secondary windings to provide the switching signal to the semiconductor switching means.

7. The device according to claim 6 further comprising:
a load in the form of a gas discharge lamp connected to the third output terminals.

8. The device according to claim 5 further comprising:
a first diode in parallel with one of the pair of npn bipolar transistors and a second diode coupled in parallel with the other of the pair of npn bipolar transistors.

9. An energy conversion device employing an electronic converter having DC input terminals and adapted to deliver a high frequency signal to its output terminals, the device comprising:
voltage source means providing an input current;
first rectifier means having first AC input terminals and first DC output terminals wherein said first AC input terminals are connected to the voltage source means;
second rectifier means having second AC input terminals and second DC output terminals wherein said second DC output terminals of the first and second rectifier means are coupled to the DC capacitor means coupled to the DC input terminals;
semiconductor switching means coupled to the DC input terminals;
resonant oscillator circuit means coupled to the DC input terminals and to the semiconductor switching means wherein said resonant oscillator circuit draws an alternating current from the DC input terminals, and further wherein the resonant oscillator circuit means comprises (i) a resonant inductor having a primary winding and a second winding, (ii) a resonant capacitor connected with the primary winding of the resonant inductor and coupled across third output terminals, (iii) a switching feedback loop responsive to instantaneous magnitude of the alternating current to deliver to the semiconductor switching means a switching signal proportional to the instantaneous magnitude of the alternating current, and (iv) a load connected across the third output terminals; and
input-output means coupled between the resonant oscillator circuit means and the second rectifier means wherein the input-output means provides (i) a substantially constant magnitude high frequency signal at the third output terminals and (ii) a substantially sinusoidal input current.

10. An energy conversion device employing an electronic converter having DC input terminals and adapted to deliver a high frequency signal to its output terminals, the device comprising:
voltage source means providing an input current;
first rectifier means having first AC input terminals and first DC output terminals wherein said first AC input terminals are first DC output terminals wherein said first AC input terminals are connected to the voltage source means;
second rectifier means having second AC input terminals and second DC output terminals wherein said second DC output terminals of the first and second rectifier means are coupled to the DC input terminals;
capacitor means coupled to the DC input terminals;
semiconductor switching means coupled to the DC input terminals;
resonant oscillator circuit means coupled to the DC input terminals and to the semiconductor switching means wherein said resonant oscillator circuit draws an alternating current from the DC input terminals, and further wherein the resonant oscillator circuit means comprises (i) a resonant inductor having a primary winding and a secondary winding, (ii) a resonant capacitor connected with the primary winding of the resonant inductor and coupled across third output terminals, (iii) a switching feedback loop responsive to instantaneous magnitude of the alternating current to deliver to the semiconductor switching means a switching signal proportional to the instantaneous magnitude of the alternating current, and (iv) a load connected across the third output terminals; and
input-output means coupled between the resonant oscillator circuit means and the second rectifier means wherein the input-output means provides (i) a substantially constant magnitude high frequency signal at the third output terminals and (ii) a substantially sinusoidal input current wherein the input-output means has a ballasting inductor connected in a series circuit loop with the second winding of the resonant inductor and the second AC input terminals of the second rectifier means.

11. An energy conversion device employing an electronic converter having DC input terminals and adapted to deliver a high frequency signal to its output terminals, the device comprising:
voltage source means providing an input current;
first rectifier means having first AC input terminals and first DC output terminals wherein said first AC input terminals are connected to the voltage source means;
second rectifier means having second AC input terminals and second DC output terminals wherein said second DC output terminals of the first and second rectifier means are coupled to the DC input terminals;
capacitor means coupled to the DC input terminals;
semiconductor switching means coupled to the DC input terminals;
resonant oscillator circuit means coupled to the DC input terminals and to the semiconductor switching means wherein said resonant oscillator circuit draws an alternating current from the DC input terminals, and further wherein the resonant oscillator circuit means comprises (i) a resonant inductor having a primary winding and a secondary winding, (ii) a resonant capacitor connected with the primary winding of the resonant inductor and coupled across third output terminals, (iii) a switching feedback loop responsive to instantaneous magnitude of the alternating current to deliver to the semiconductor switching means a switching signal proportional to the instantaneous magnitude of the alternating current, and (iv) a load connected across the third output terminals; and input-output means coupled between the resonant oscillator circuit means and the second rectifier means wherein the input-output means provides (i) a substantially constant magnitude high frequency signal at the third output terminals and (iii) a substantially sinusoidal input current wherein instantaneous magnitude of a voltage developed across the resonant inductor is modulated by a voltage of instantaneous magnitude proportional to a difference between instantaneous magnitude of a voltage developed across the DC input terminals and instantaneous magnitude of a voltage provided by a rectified AC voltage source.

* * * * *